US012344025B1

(12) United States Patent
Feng

(10) Patent No.: US 12,344,025 B1
(45) Date of Patent: Jul. 1, 2025

(54) WRITING IMPLEMENT

(71) Applicant: Shin Feng, Rowland Heights, CA (US)

(72) Inventor: Shin Feng, Rowland Heights, CA (US)

(73) Assignee: Shin Feng, Rowland Heights, CA (US)

( * ) Notice: Subject to any disclaimer, the term of this patent is extended or adjusted under 35 U.S.C. 154(b) by 0 days.

(21) Appl. No.: 18/661,615

(22) Filed: May 11, 2024

(51) Int. Cl.
*B43K 23/12* (2006.01)
*B43K 1/01* (2006.01)
*B43K 5/00* (2006.01)

(52) U.S. Cl.
CPC .............. *B43K 23/128* (2013.01); *B43K 1/01* (2013.01); *B43K 5/005* (2013.01)

(58) Field of Classification Search
CPC ........ B43K 23/128; B43K 1/01; B43K 5/005; B43K 23/08; B43K 23/12; B43K 23/126
USPC ......................... 401/243, 244, 246, 247, 251
See application file for complete search history.

(56) References Cited

U.S. PATENT DOCUMENTS

| | | | | |
|---|---|---|---|---|
| 1,586,369 A * | 5/1926 | Koplow | B43K 23/12 | 403/329 |
| 3,467,476 A * | 9/1969 | Konig | B43K 23/126 | 285/321 |
| 6,223,391 B1 * | 5/2001 | Kuo | A45C 13/262 | 190/115 |
| 10,286,724 B1 * | 5/2019 | Moore | B43K 23/12 | |

* cited by examiner

*Primary Examiner* — David J Walczak

(57) ABSTRACT

A writing implement comprises a main body and a cap, and the main body comprises a plunger. An undercut is formed on an inner wall of the cap. When the cap is engaging to the main body, a load from the inner wall of the cap is applied to the plunger. The cap is interlocked to the main body when the load against the plunger is reduced or removed. With such a structure, the writing implement can be attached and detached smoothly between two detachable parts such as the cap and the main body. Also, it is possible to reduces friction and wear on an engaging and interlocking section.

15 Claims, 5 Drawing Sheets

WRITING IMPLEMENT

BACKGROUND OF THE INVENTION

1. Field of the Invention

The present invention relates to a writing implement comprising an engaging and interlocking mechanism between two detachable parts, such as a cap and a main body of the writing implement.

2. Description of the Related Art

A writing implement with a nib includes a cap to protect it. There are two main methods for attaching and detaching the cap and the main body: a screw method and an engaging and interlocking method. With the screw method, the cap is attached by screwing together the external thread of the main body and the internal thread of the cap, which provides internal airtightness. However, the screw method takes time to attach and detach. In contrast, the engaging and interlocking method is engaged and interlocked by a combination of concavo-convex or convex-convex using projections and undercuts. This method allows the cap to be attached and detached easily and quickly by pressing the cap into the main body. This improves user experience.

However, due to repeated attachment and detachment, the projections and undercuts of the engaging and interlocking section wear out. As a result, the interlocking force gradually decreases. In some cases, the interlocking parts can be replaced, but in many cases, the writing implement itself must be replaced. In addition, the quality of the surface deteriorates due to friction and wear caused by engaging and interlocking, leading to a deterioration in appearance.

SUMMARY OF THE INVENTION

It is an object of the present invention to provide a writing implement that is able to be attached and detached smoothly in an engaging and interlocking mechanism between two detachable parts. It is still another object of the present invention to provide a writing implement including an engaging and interlocking mechanism that reduces friction and wear on the engaging and interlocking section.

In the present invention, a writing implement comprises a main body and a cap, and the main body comprises a plunger. An undercut is formed on an inner wall of the cap. When the cap is engaging to the main body, a load from the inner wall of the cap is applied to the plunger. The cap is interlocked to the main body when the load against the plunger is reduced or removed.

In the above structure, the plunger comprises a housing body, a spring and a ball, and the spring and the ball are held inside of the housing body. The load is applied to the ball.

In accordance with one aspect of the present invention, a writing implement comprises a main body and a cap, and the main body comprises a plunger. An undercut is formed on an inner wall of the cap. The plunger fits to the undercut when the cap is attached to the main body.

In the above structure, the plunger comprises a housing body, a spring and a ball, and the spring and the ball are held inside of the housing body. A portion of the ball is protruded from an upper section of the housing body. The ball is rotated on the inner wall of the cap in a process of attaching and detaching of the cap.

In accordance with another aspect of the present invention, the writing implement comprises a main body and a cap, and the main body comprises a grip section, a barrel and a writing tip. The grip section comprises a plunger. An undercut is formed on an inner wall of the cap. The plunger and the undercut are in contact when the cap is attached to the main body.

In the above structure, the plunger comprises a housing body, a spring and a ball, and the spring and the ball are held inside of the housing body. The ball of the plunger and the undercut are in contact. The writing tip is not particularly limited. For example, a nib of fountain pen, a tip of ball point pen or a tip of roller ball pen may be used.

Note that the main body comprises at least two plungers. Also, an upper section of the housing body of the plunger may comprise a recess.

The material of the writing implement is not particularly limited. For example, metal, resin, plastic, ceramic, etc. can be used. It is preferable that the ball and the spring of the plunger is made of metal.

The present invention can provide a writing implement that is able to be attached and detached smoothly in an engaging and interlocking mechanism between two detachable parts. Also, the present invention can provide a writing implement including an engaging and interlocking mechanism that reduces friction and wear on the engaging and interlocking section.

DETAILED DESCRIPTION OF THE INVENTION

Figure 1:
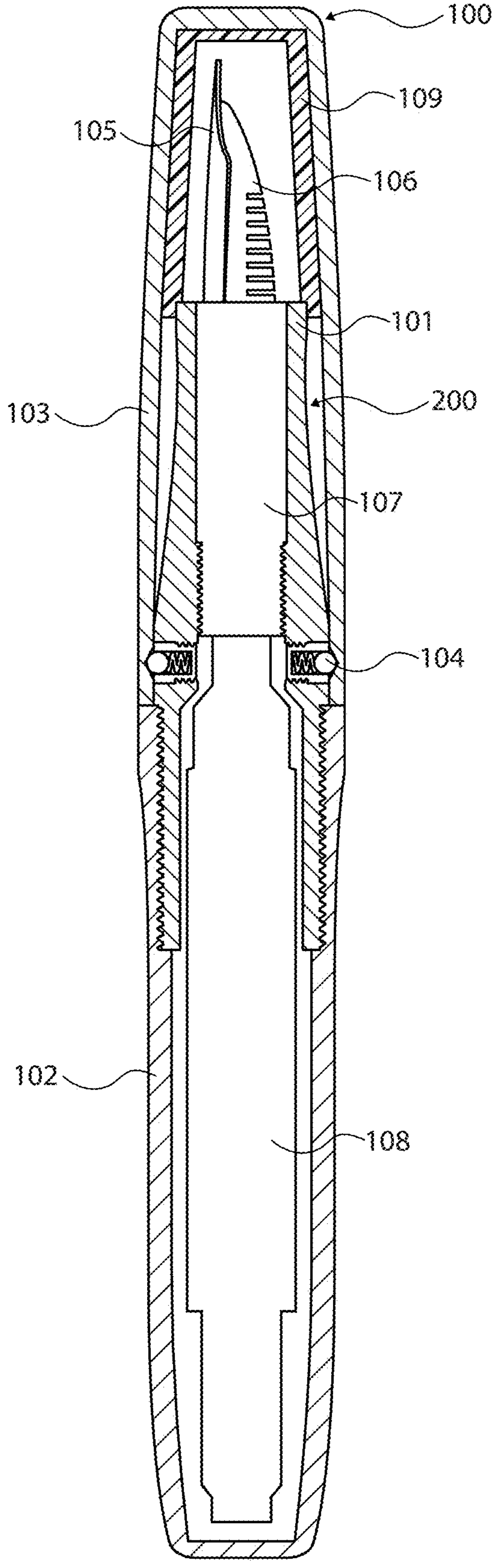
FIG. 1 is a cross-sectional view of showing an example of a writing implement of the present invention.

Embodiment modes of the present invention will be explained hereinafter with reference to the accompanying drawings. However, the present invention is not limited to the explanation below, and it is easily understood by those skilled in the art that modes and details of the present invention can be modified in various ways without departing from the purpose and the scope of the present invention. Therefore, the present invention should be construed as being included therein. Note that, in the structure of the present invention which will be hereinafter explained, reference numerals denoting the same portions are used in common between drawings in some cases.

Embodiment Mode

Figure 2:
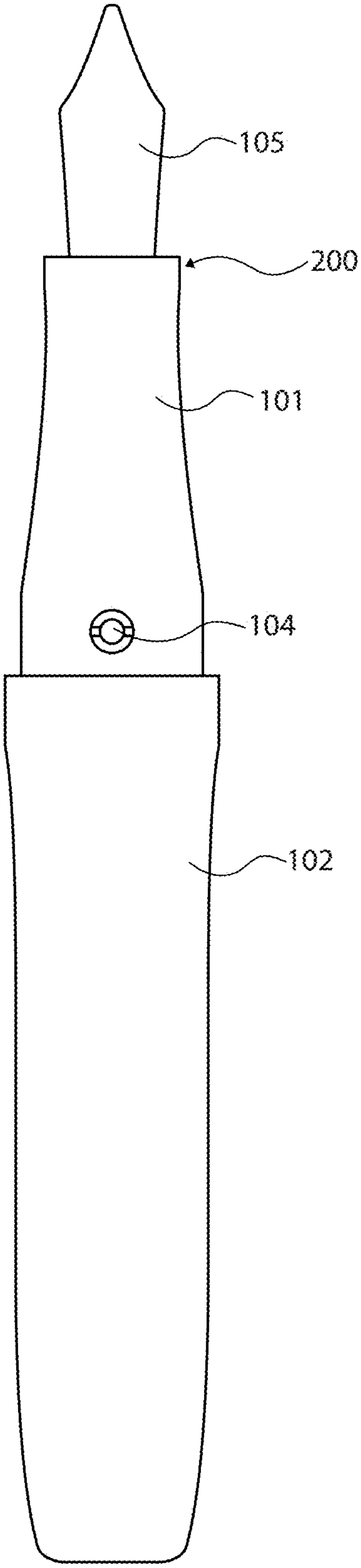
FIG. 2 is a side view showing the writing implement illustrated in FIG. 1.
Figure 3:
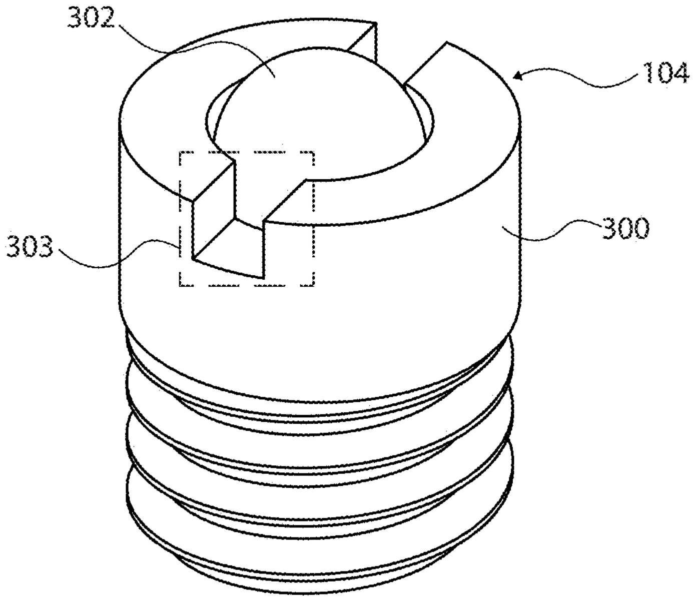
FIG. 3 is a perspective view showing a plunger illustrated in FIG. 1.
Figure 4:
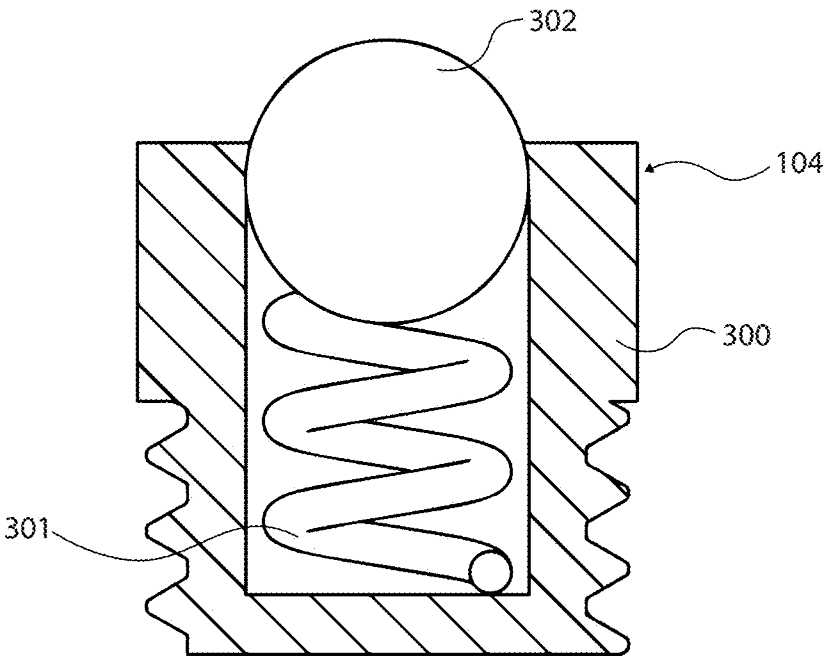
FIG. 4 is a cross-sectional view showing the plunger illustrated in FIG. 1.

An example of a writing implement of the present invention is described with reference to FIG. 1 and FIG. 2. FIG. 1 shows a cross-sectional view of the writing implement and FIG. 2 shows a side view of the writing implement without a cap. The writing implement 100 shown in FIG. 1 includes a main body 200 having a grip section 101 and a barrel 102, and a cap 103 that is detachable from the main body 200. A plunger 104 is screwed into the grip section 101. A perspective view and a cross-sectional view of the plunger 104 are shown in FIG. 3 and FIG. 4, respectively. The plunger 104 includes a spring 301 and a ball 302 in a housing body 300. The ball 302 is held inside of the housing body 300. It prevents the ball 302 from ejecting out. A portion of the ball 302 is protruded from an upper section of the housing body 300. The ball 302 sinks into the housing body 300 when a load is applied to the ball 302 and the ball 302 returns to its original position when the load is removed by the force of the spring 301. The upper section of the housing body 300 is provided with a recess 303 as shown in FIG. 3, which allows for screwing the plunger 104 into the grip section 101 easily. Additionally, if the plunger breaks, it can be easily replaced.

The main body 200 has a function of writing. A nib 105 with a feed 106 is inserted to the collar 107. The collar 107 is screwed to inside of the grip section 101. An ink reservoir 108 is attached with the feed 106 located in the collar 107 and is housed inside of the main body 200 by screwing the grip section 101 to the barrel 102. Note that examples of the ink reservoir 108 include, but are not limited to, a converter and a cartridge.

The cap 103 includes an inner cap 109. The inner cap 109 is in contact with the grip section 101 when the cap 103 is attached, so that it improves internal airtightness. It also helps with alignment of the main body 200 including the writing tip such as the nib 105 and the feed 106.

Figure 6:
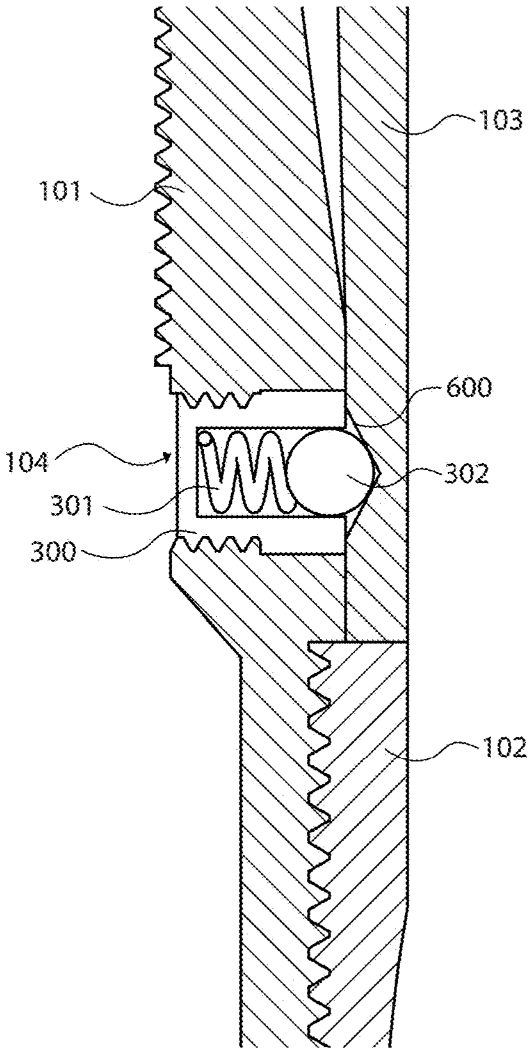
FIG. 6 is a partially enlarged sectional view of the writing implement illustrated in FIG. 1.

When the writing implement is not in use, attaching the cap 103 to the grip section 101 prevents ink from drying out and protects the nib from external impacts. A partially enlarged sectional view of the writing implement 100 around plunger 104 is shown in FIG. 6. An undercut 600 is formed over the circumference of the inner wall of the cap 103, so that the ball 302 fits to the undercut 600 when the cap 103 is attached on the grip section 101.

The undercut 600 and plunger 104 are used for attaching and detaching the cap 103. When the cap 103 is being attached, the main body 200 is inserted into the cap 103. When the cap 103 is engaging to the main body 200, the ball 302 sinks into the housing body 300 of the plunger 104 due to the load caused by the inner wall of the cap 103. Simultaneously, the ball 302 is rotated by the inner wall of the cap 103. When the ball 302 reaches the undercut 600, the load is reduced or removed and the cap 103 is attached to the grip section 101. Similarly, when the cap 103 is being detached, the ball 302 sinks due to the load caused by the inner wall of the cap 103 as the ball 302 is rotated by the inner wall of the cap 103. When the main body 200 is ejected from the cap 103, the ball 302 is released from the load.

In the above structure, it is possible to reduce friction and wear on the inner wall of the cap 103 and undercut 600 when the cap 103 is attached and detached, and to prevent the decrease of the interlocking force between the cap 103 and the main body 200. It is also possible to reduce deterioration of surface quality.

Figure 7:
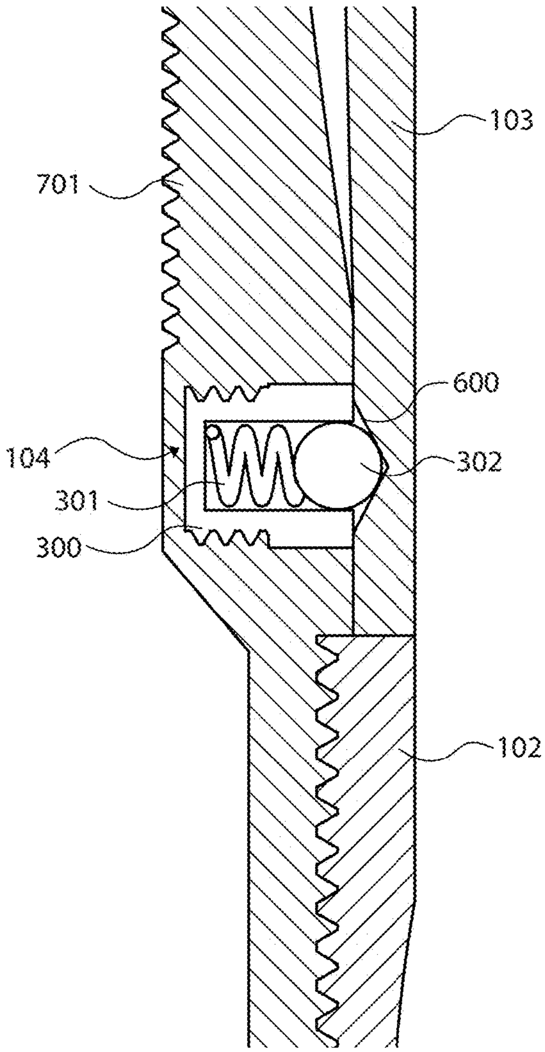
FIG. 7 is a partially enlarged sectional view of other example of a writing implement.

In the writing implement 100 shown in FIG. 1 and FIG. 6, the plunger 104 is screwed into a through hole in the grip section 101, but it may also be screwed into a closed hole in a grip section 701 as shown in FIG. 7.

Figure 5:
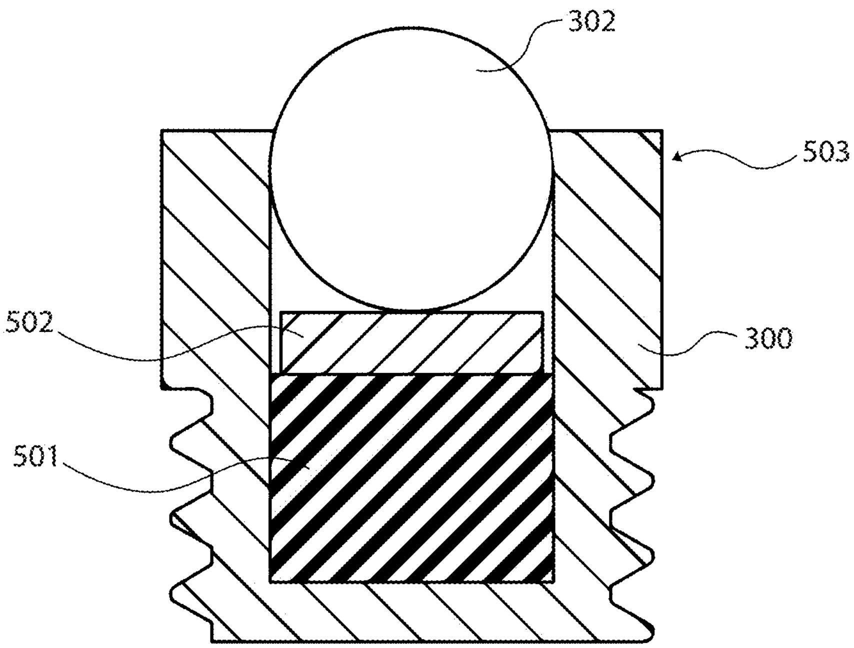
FIG. 5 is a cross-sectional view of other example of a plunger.

The plunger 104 is not particularly limited, as long as a member at the tip of plunger sinks into the housing body when a load is applied to the member and the member can return to its original position when the load is removed. For example, instead of the spring 301, a plunger 503 as shown in FIG. 5 that includes a cushion member 501 made of rubber and support plate 502, a plunger that includes a magnet, etc. may be used.

The housing body 300 of the plunger 104 is not necessary to have a recess on the upper section and a thread on the side. In that case, the plunger can be attached to the grip section by press fitting or using adhesive. However, it is preferable that the plunger 104 is screwed into the grip section in consideration of maintenance.

The number of plungers 104 of the writing implement 200 is not particularly limited as long as it is two or more.

The shape and depth of the undercut 600 on the inner wall of the cap 103 are not particularly limited as long as the undercut 600 reduce or remove the load against the plunger 104 from the inner wall of the cap 103. For example, it can be a round shape. While it is preferable for the undercut 600 to be continuous, it can also be non-continuous.

As described above, the present invention can provide a writing implement that is able to be attached and detached smoothly by reducing friction in an engaging and interlocking mechanism between two detachable parts. Additionally, it is possible to reduce friction and wear on the engaging and interlocking section and reduce weakening of the interlocking force. Furthermore, it is possible to reduce deterioration of surface quality on the engaging and interlocking section.

The invention claimed is:

1. A writing implement comprising:
a main body; and
a cap,
wherein said main body comprises two or more plungers,
wherein each of said plungers comprises a housing body and a ball,
wherein an undercut is formed on an inner wall of said cap,
wherein a load from said inner wall of said cap is applied to said plungers when said cap is engaging to said main body,
wherein said cap is interlocked to said main body when said load against said plungers is reduced or removed.

2. A writing implement according to claim 1,
wherein each of said plungers comprises said housing body, a spring and said ball,
wherein said spring and said ball are retained inside of said housing body,
wherein a portion of said ball is protruded from said housing body,
wherein said load is applied to said ball.

3. A writing implement according to claim 1,
wherein each of said plungers comprises said housing body, a spring and said ball,
wherein said spring and said ball are retained inside of said housing body,
wherein said load is applied to said ball,
wherein an upper section of said housing body comprises two recesses.

4. A writing implement according to claim 1,
wherein said undercut is formed over a circumference of said inner wall of said cap.

5. A writing implement according to claim 1,
wherein said undercut is formed over a circumference of said inner wall of said cap,
wherein each of said plungers comprises said housing body, a spring and said ball,
wherein said spring and said ball are retained inside of said housing body,
wherein said load is applied to said ball.

6. A writing implement according to claim 1,
wherein said undercut is formed over a circumference of said inner wall of said cap,
wherein each of said plungers comprises said housing body, a spring and said ball,
wherein said spring and said ball are retained inside of said housing body,
wherein said load is applied to said ball,
wherein an upper section of said housing body comprises two recesses.

7. A writing implement according to claim 1,
wherein said main body a comprises a grip section and a barrel,
wherein a side of said housing body comprises a thread,
wherein each of said plungers is screwed into said grip section.

8. A writing implement comprising:
a main body; and
a cap,
wherein said main body comprises two or more plungers,
wherein each of said plungers comprises a housing body and a ball,
wherein an undercut is formed on an inner wall of said cap,
wherein said plungers fit to said undercut when said cap is attached to said main body.

9. A writing implement according to claim 8,
wherein each of said plungers comprises said housing body, a spring and said ball,
wherein said spring and said ball are retained inside of said housing body.

10. A writing implement according to claim 8,
wherein each of said plungers comprises said housing body, a spring and said ball,
wherein said spring and said ball are retained inside of said housing body,
wherein a portion of said ball is protruded from an upper section of said housing body.

11. A writing implement according to claim 8,
wherein each of said plungers comprises said housing body, a spring and said ball,
wherein said spring and said ball are retained inside of said housing body,
wherein said ball is rotated on said inner wall of said cap in a process of attaching and detaching of said cap.

12. A writing implement according to claim 8,
wherein said main body comprises a grip section and a barrel,
wherein a side of said housing body comprises a thread,
wherein each of said plungers is screwed into said grip section.

13. A writing implement comprising:
a main body; and
a cap;
wherein said main body comprises a grip section, a barrel and a writing tip,
wherein said grip section comprises two or more plungers,
wherein each of said plungers comprises a housing body and a ball,
wherein an undercut is formed on an inner wall of said cap,
wherein said plungers and said undercut are in contact when said cap is attached to said main body.

14. A writing implement according to claim 13,
wherein each of said plungers comprises said housing body, a spring and said ball,
wherein said spring and said ball are retained inside of said housing body,
wherein a portion of said ball is protruded from said housing body,
wherein said balls of said plungers and said undercut are in contact.

15. A writing implement according to claim 13,
wherein said undercut is formed over a circumference of said inner wall of said cap.

* * * * *